US012649294B2

(12) United States Patent
Ahn et al.

(10) Patent No.: US 12,649,294 B2
(45) Date of Patent: Jun. 9, 2026

(54) APPARATUS FOR COMPRESSING JOINT OF ELECTRODE TAB AND ELECTRODE LEAD

(71) Applicant: LG Energy Solution, Ltd., Seoul (KR)

(72) Inventors: Heejun Ahn, Daejeon (KR); Sangkee Seo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 269 days.

(21) Appl. No.: 18/578,122

(22) PCT Filed: Dec. 23, 2022

(86) PCT No.: PCT/KR2022/021147
§ 371 (c)(1),
(2) Date: Jan. 10, 2024

(87) PCT Pub. No.: WO2023/128478
PCT Pub. Date: Jul. 6, 2023

(65) Prior Publication Data
US 2024/0316891 A1 Sep. 26, 2024

(30) Foreign Application Priority Data
Dec. 27, 2021 (KR) ........................ 10-2021-0188275

(51) Int. Cl.
B30B 15/00 (2006.01)
B08B 5/02 (2006.01)
(Continued)

(52) U.S. Cl.
CPC ............ B30B 15/0082 (2013.01); B08B 5/02 (2013.01); B08B 5/04 (2013.01); H01M 10/0404 (2013.01);
(Continued)

(58) Field of Classification Search
CPC ......... B08B 5/02; B08B 5/04; B30B 15/0082; H01M 50/536; B21B 45/0287
See application file for complete search history.

(56) References Cited

U.S. PATENT DOCUMENTS 5,457,847 A * 10/1995 Uzawa .................... B08B 5/026
15/345
6,197,074 B1 * 3/2001 Satou .................. H01M 50/531
429/211
(Continued)

FOREIGN PATENT DOCUMENTS

CN 209200092 U 8/2019
EP 3780156 A1 2/2021
(Continued)

OTHER PUBLICATIONS

WO 2013/137584A1, Yim Sep. 2013.*
(Continued)

*Primary Examiner* — Edward T Tolan
(74) *Attorney, Agent, or Firm* — Lerner David LLP

(57) ABSTRACT

An apparatus for compressing a joint between an electrode tab extending from an electrode assembly and electrode lead includes an upper pressing unit, a lower pressing unit, a suction unit, and a driving unit for moving the upper and lower pressing units up and down. The apparatus includes an air injection nozzle that injects air obliquely from an exterior region of an upper compressing member toward the joining surface of the electrode tab and electrode lead.

6 Claims, 5 Drawing Sheets

100

(51) Int. Cl.

| | | |
|---|---|---|
| *B08B 5/04* | (2006.01) | |
| *H01M 10/04* | (2006.01) | |
| *H01M 50/536* | (2021.01) | |

(52) U.S. Cl.

CPC ..... *H01M 10/0481* (2013.01); *H01M 50/536* (2021.01)

(56) References Cited

U.S. PATENT DOCUMENTS

| | | | | |
|---|---|---|---|---|
| 9,246,154 | B2 * | 1/2016 | Ryu ..................... | H01M 50/119 |
| 2015/0056506 | A1 | 2/2015 | Lilley et al. | |
| 2019/0148705 | A1 * | 5/2019 | Park ................... | H01M 50/533 |
| | | | | 429/452 |
| 2021/0050580 | A1 * | 2/2021 | Park ................. | H01M 10/0525 |
| 2022/0102796 | A1 * | 3/2022 | Jeong ............... | B29C 66/81457 |
| 2022/0209373 | A1 * | 6/2022 | Jung .................. | H01M 50/103 |

FOREIGN PATENT DOCUMENTS

| | | | |
|---|---|---|---|
| JP | H0640488 | B2 | 5/1994 |
| JP | 4057672 | B2 | 3/2008 |
| JP | 2016030280 | A | 3/2016 |
| JP | 6874763 | B2 | 5/2021 |
| JP | 6885072 | B2 | 6/2021 |
| KR | 20050121113 | A | 12/2005 |
| KR | 20060027249 | A | 3/2006 |
| KR | 20140113646 | A | 9/2014 |
| KR | 101569798 | B1 | 11/2015 |
| KR | 101613426 | B1 | 4/2016 |
| KR | 101813249 | B1 | 12/2017 |
| KR | 20180010803 | A | 1/2018 |
| KR | 20200059618 | A | 5/2020 |
| KR | 102245162 | B1 | 4/2021 |
| KR | 20210153938 | A | 12/2021 |
| WO | 2017195496 | A1 | 11/2017 |

OTHER PUBLICATIONS

International Search Report for PCT/KR2022/021147 mailed Apr. 3, 2023. 4 pages.

Extended European Search Report including Written Opinion for Application No. 22916620.2, dated Apr. 17, 2025. 9 pgs.

\* cited by examiner

【Figure 1】
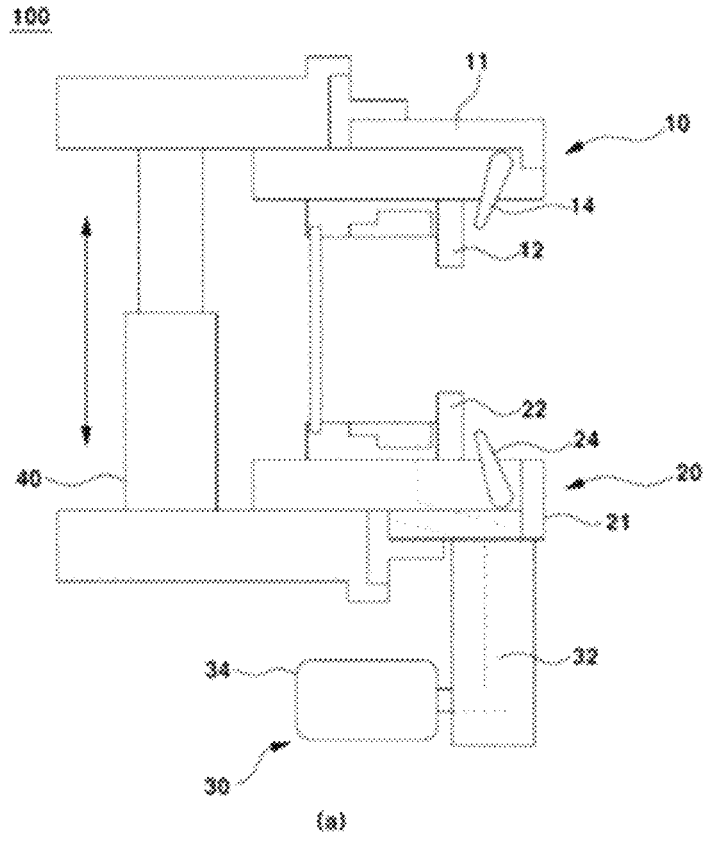
(a)
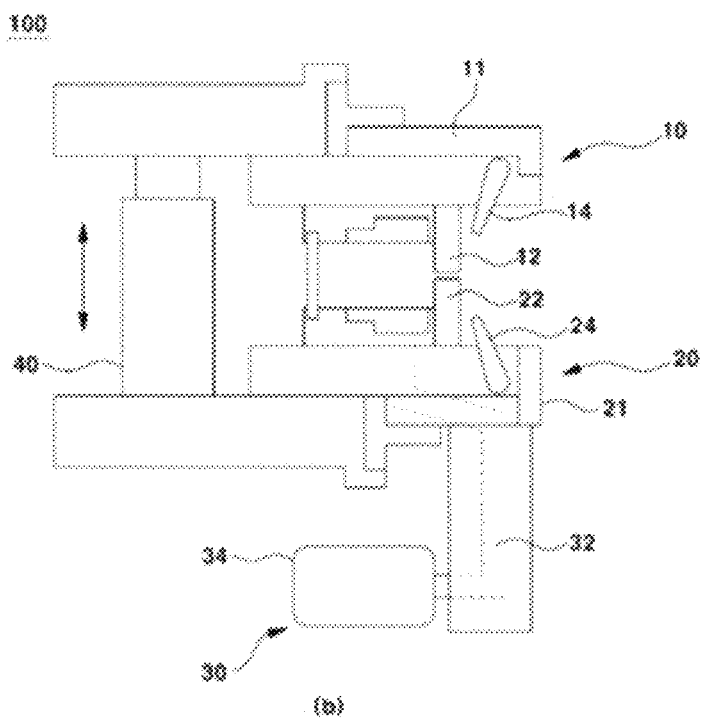
(b)

【Figure 2】
100
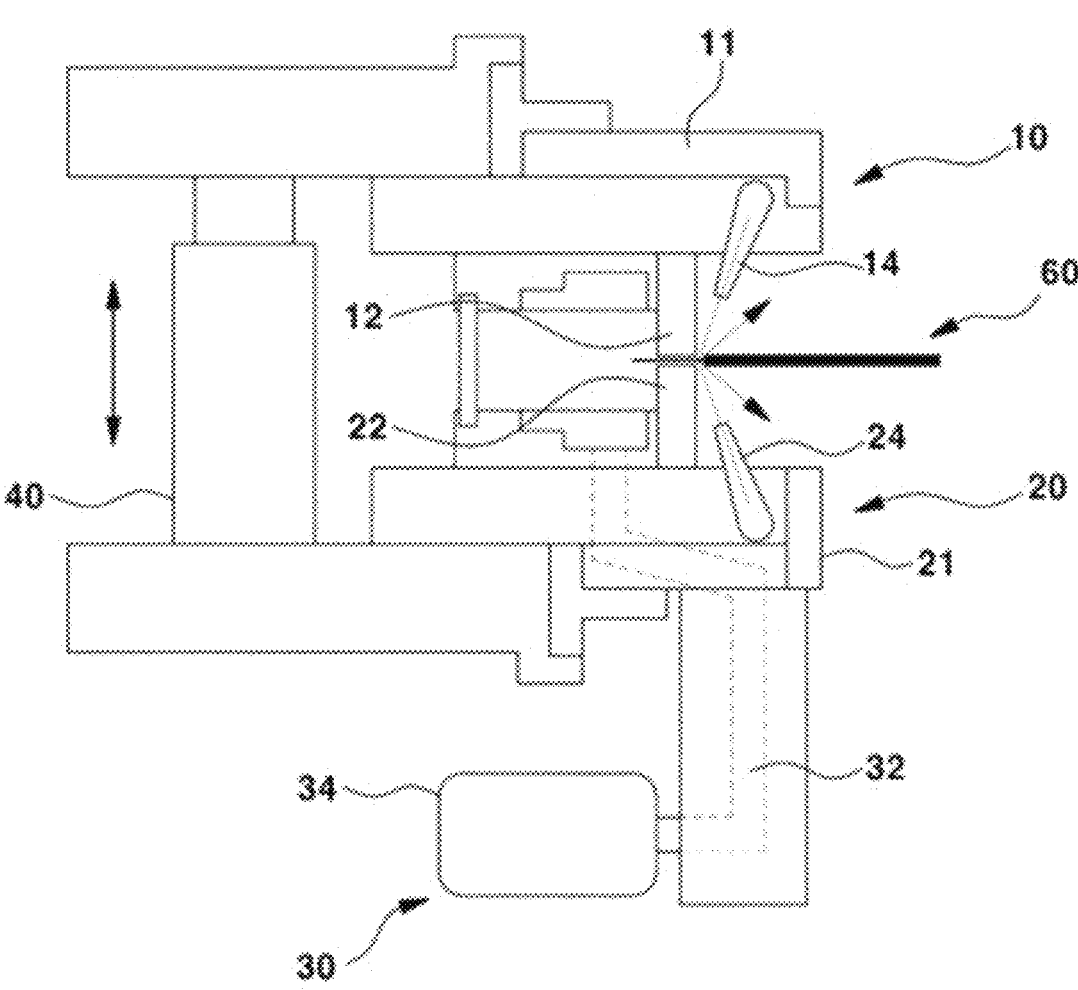

【Figure 3】
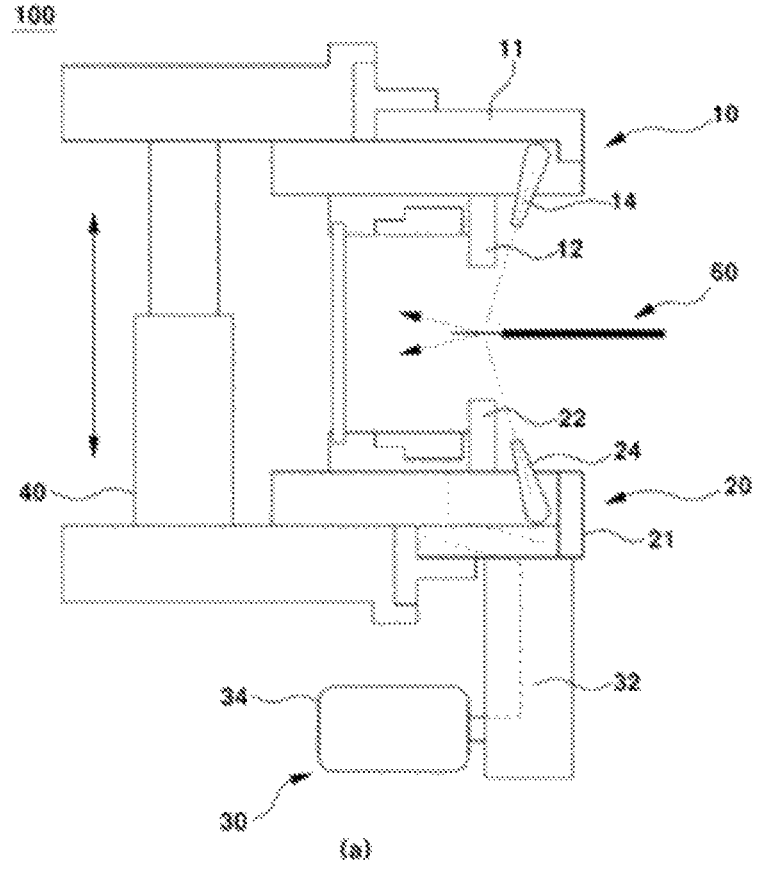
(a)
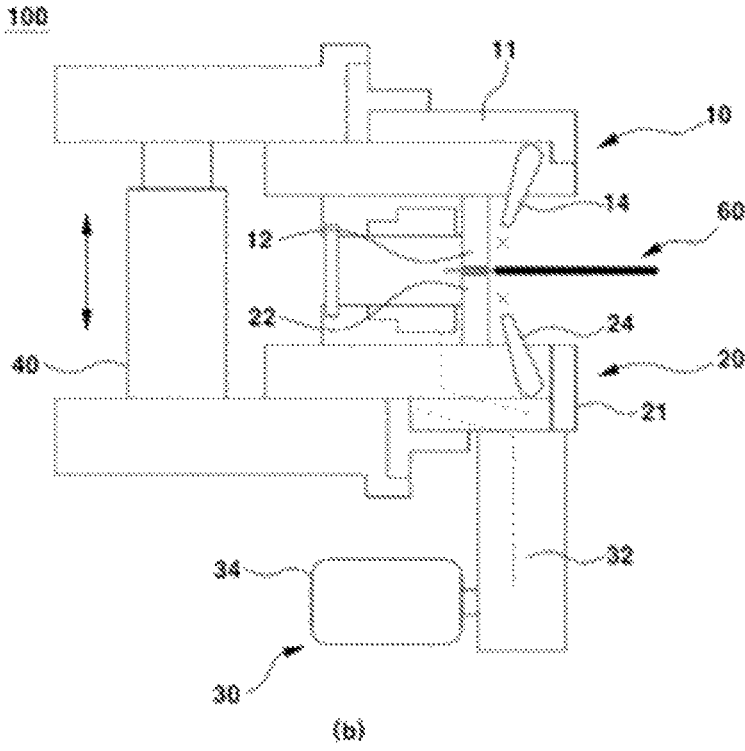
(b)

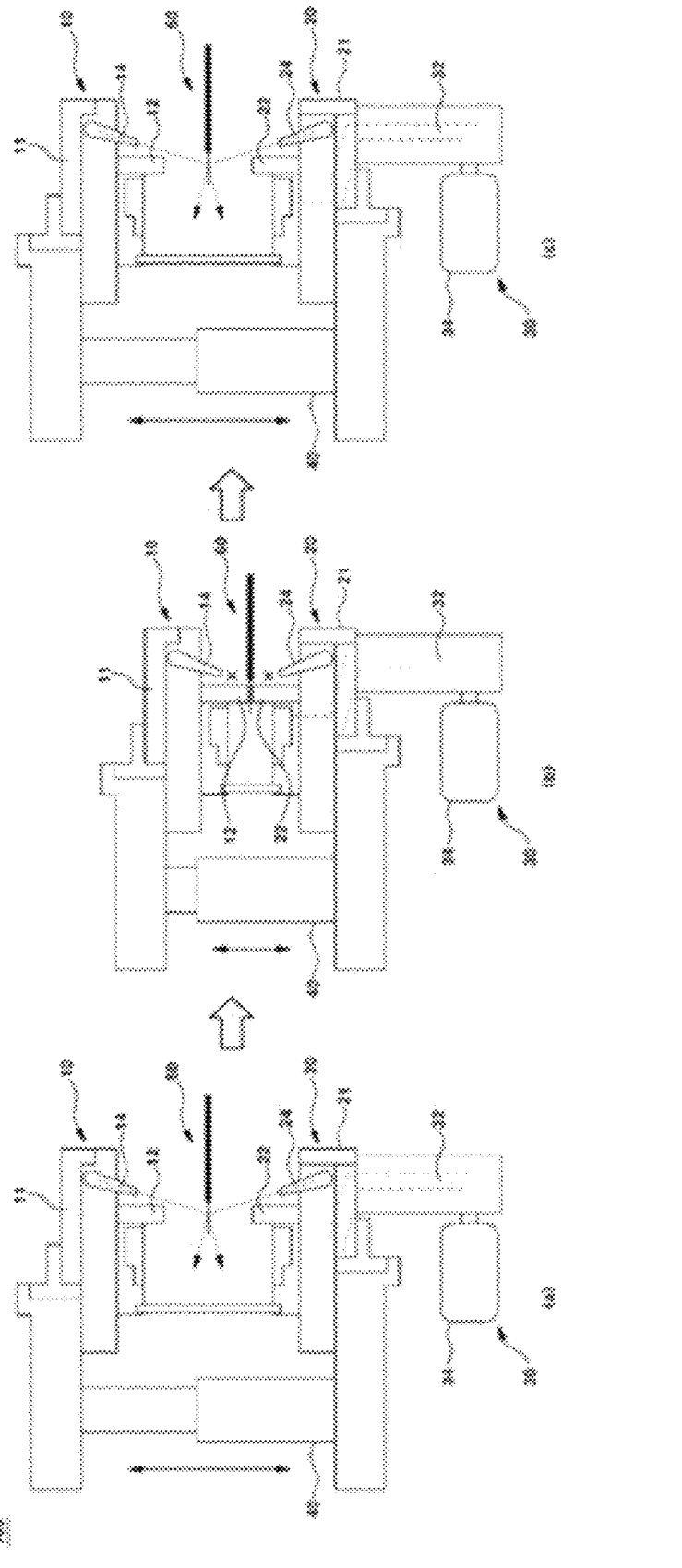
[Figure 4]

【Figure 5】
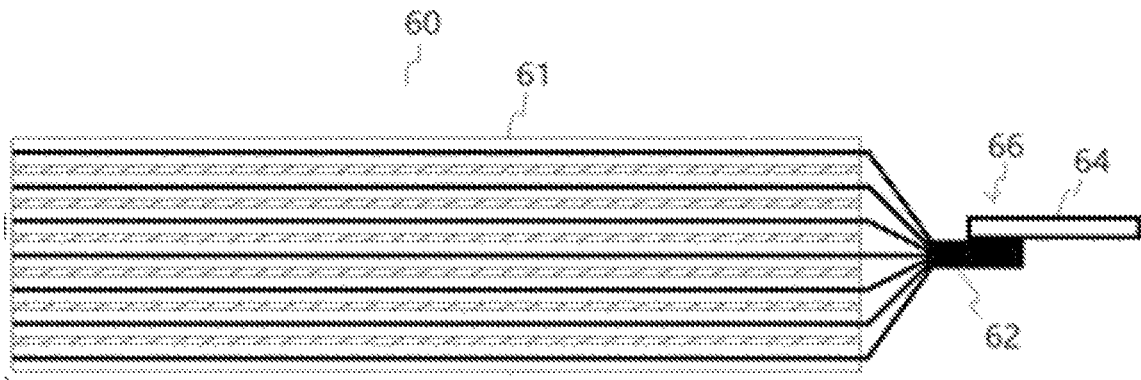

APPARATUS FOR COMPRESSING JOINT OF ELECTRODE TAB AND ELECTRODE LEAD

CROSS-REFERENCE TO RELATED APPLICATIONS

This application is a national phase entry under 35 U.S.C. § 371 of International Application No. PCT/KR2022/021147 filed on Dec. 23, 2022, which claims the benefit of priority based on Korean Patent Application No. 10-2021-0188275 filed on Dec. 27, 2021, all contents of which are incorporated as a part of the present specification.

TECHNICAL FIELD

The present disclosure relates to an apparatus for compressing a joint of an electrode tab and an electrode lead.

BACKGROUND ART

As the technology development and demand for mobile devices increase, a demand for batteries as an energy source has rapidly increased. Accordingly, many studies on the batteries that may satisfy various demands have been conducted. In particular, studies on lithium secondary batteries such as lithium ion secondary batteries and lithium ion polymer secondary batteries having high energy density, discharge voltage, and output stability are being actively conducted.

The lithium secondary battery is classified according to a structure of an electrode assembly formed of a cathode, an anode, and a separator, in which examples of representative electrode assemblies may include a jelly-roll type (wound type) electrode assembly having a structure in which long sheet-type cathodes and anodes are wound with a separator interposed therebetween, a stack type (laminate type) electrode assembly in which a plurality of cathodes and anodes cut in units of a predetermined size are sequentially stacked with a separator interposed therebetween, and a stack/folding type electrode assembly having a structure where bi-cells or full cells in which cathodes and anodes in predetermined units are stacked with separators interposed therebetween are wound, and the like.

The process of manufacturing such an electrode assembly includes a process of manufacturing cathode and anode slurries, a process of manufacturing electrode sheets composed of cathodes and an anodes by applying the respective slurries to cathode current collectors and anode current collectors, respectively, a process of pressing the electrode sheets, a process of slitting the electrode sheets according to cell specifications, a vacuum drying process, a process of manufacturing electrodes by forming electrode tabs on the electrode assembly, and a process of manufacturing the electrode assembly in a jelly-roll type, a stack type, etc., by stacking the plurality of cathodes and anodes with a separator interposed therebetween.

Thereafter, a process of welding the electrode tabs of the manufactured electrode assembly, welding an electrode leads to the welded electrode tabs, and compressing joints of the electrode tabs and the electrode leads is performed.

In the case of a process of compressing the joint of the electrode tab and the electrode lead, since foreign matters generated during in the process of manufacturing an electrode assembly are present in an electrode tab part, an electrode lead part, and a joint of the electrode tab part and the electrode lead part, and foreign matters are generated during the compressing process, it is important to efficiently remove the foreign matters. This is because these foreign matters may act as a cause of contaminating a body of the electrode assembly.

However, the conventional compression process does not provide a method or apparatus capable of efficiently managing these foreign matters.

RELATED ART DOCUMENT

Patent Document

Korean Patent Laid-open Publication No. 10-2014-0113646

DISCLOSURE

Technical Problem

The present disclosure solves the problems of the related art as described above, and it is an object of the present disclosure to provide an apparatus for compressing a joint of an electrode tab and an electrode lead capable of effectively preventing a body of an electrode assembly from being contaminated due to foreign matters during compression of the joint of the electrode tab and the electrode lead formed on the electrode assembly.

Technical Solution

To achieve the above object, the present disclosure provides an apparatus for compressing a joint of an electrode tab formed on an electrode assembly and an electrode lead, including:

an upper pressing unit; a lower pressing unit; a driving unit that drives the upper pressing unit and the lower pressing unit up and down; and a foreign matter suction unit, wherein the upper pressing unit includes an upper compressing member protruding downward and an upper support member in which the upper compressing member is fixed to a lower portion, and the lower pressing unit includes a lower compressing member protruding upward and a lower support member in which the lower compressing member is fixed to an upper portion, the upper compressing member and the lower compressing member are located in opposite directions on the same line, and are moved to a compressed position by driving the upper support member and the lower support member or separated in opposite directions to each other, and the upper support member includes an air injection nozzle that injects air obliquely from an outside of the upper compressing member toward a joining surface of the fed electrode tab and electrode lead.

In one aspect of the present invention, the air injection nozzle may be installed to inject air in a direction forming an angle of 10° to 80° with respect to the joining surface of the fed electrode tab and electrode lead.

In one aspect of the present invention, the air injection nozzle may be controlled not to operate at the compressed position of the upper compressing member and the lower compressing member, and to operate at a non-compressed position of the upper compressing member and the lower compressing member.

In one aspect of the present invention, the air injection nozzle may be controlled to operate when the joint of the electrode tab and the electrode lead is fed in a state where the upper compressing member is raised, not to operate from a time when the upper compressing member is lowered to a time when the upper compressing member is raised through a compression process, and to operate again when the joint of the electrode tab and electrode lead is discharged after the compression is completed.

In one aspect of the present invention, the lower support member may further include an air injection nozzle that injects air obliquely from an outside of the lower compressing member toward the joining surface of the electrode tab and the electrode lead.

In one aspect of the present invention, the air injection nozzle included in the lower support member may be installed to inject air in a direction forming an angle of 10° to 80° with respect to the joining surface of the fed electrode tab and electrode lead.

In one aspect of the present invention, the air injection nozzle included in lower support member may be controlled not to operate at the compressed position of the upper compressing member and the lower compressing member, and to operate at the non-compressed position of the upper compressing member and the lower compressing member.

In one aspect of the present invention, the air injection nozzle included in the lower support member may be controlled to operate when the joint of the electrode tab and the electrode lead is fed in a state where the lower compressing member is lowered, and not to operate from a time when the lower compressing member is raised to a time when the lower compressing member is lowered through a compression process, and to operate again when the joint of the electrode tab and electrode lead is discharged after the compression is completed.

In one aspect of the present invention, the foreign matter suction unit may include a suction pipe that communicates with a space opposite to the electrode assembly being fed based on the compressed position of the upper compressing member and the lower compressing member and an inhaler that is connected to the suction pipe.

Advantageous Effects

An apparatus for compressing a joint of an electrode tab and an electrode lead of the present disclosure prevents contamination of a body of an electrode assembly by foreign matters when the joint of the electrode tab and the electrode lead formed on the electrode assembly is compressed by a structure of an air injection device, and, furthermore, significantly improves the anti-contamination effect as described above by controlling the operation of the air injection device.

DESCRIPTION OF DRAWINGS

FIG. 1 is a cross-sectional view schematically illustrating an embodiment of an apparatus for compressing a joint of an electrode tab and an electrode lead of the present disclosure.

FIG. 2 is a cross-sectional view schematically illustrating a case where the electrode assembly is contaminated by air blowing when using the apparatus for compressing a joint of an electrode tab and an electrode lead of the present disclosure.

FIG. 3 is a cross-sectional view schematically illustrating one state of use of the apparatus for compressing a joint of an electrode tab and an electrode lead of the present disclosure.

4

FIG. 4 is a cross-sectional view schematically illustrating another state of use of the apparatus for compressing a joint of an electrode tab and an electrode lead of the present disclosure.

FIG. 5 is a cross-sectional view schematically illustrating a form of an electrode assembly.

BEST MODE

Hereinafter, the embodiments of the present invention will be described in detail with reference to the accompanying drawings so that those skilled in the art may easily practice the present disclosure. However, the present disclosure may be implemented in various different forms, and is not limited to embodiments described herein. Throughout the present disclosure, similar components will be denoted by the same reference numerals.

When one element is referred to as being "connected to, provided with, or installed in" another element, it should be understood that it may be directly connected to or installed in another element, but other elements may be interposed therebetween. On the other hand, when one element is referred to as being "directly connected to, provided with, or installed in" another element, it should be understood that other elements are not interposed therebetween. Meanwhile, other expressions describing a relationship between components, that is, "upper portion ~", "directly upper portion ~", or "between ~", "directly between ~", or "adjacent to ~," "directly adjacent to ~" and the like, should also be interpreted in the same way.

FIG. 1 is a cross-sectional view schematically illustrating an embodiment of an apparatus for compressing a joint of an electrode tab and an electrode lead of the present disclosure, FIG. 3 is a cross-sectional view schematically illustrating one state of use of the apparatus for compressing a joint of an electrode tab and an electrode lead of the present disclosure, FIG. 4 is a cross-sectional view schematically illustrating another state of use of the apparatus for compressing a joint of an electrode tab and an electrode lead of the present disclosure, and FIG. 5 is a cross-sectional view schematically illustrating a form of an electrode assembly.

An apparatus 100 for compressing a joint of an electrode tab and an electrode lead of the present disclosure is an apparatus for compressing a joint 66 of an electrode tab 62 formed on an electrode assembly 60 and an electrode lead 64, the apparatus including an upper pressing unit 10; a lower pressing unit 20; a driving unit 40 that drives the upper pressing unit 10 and the lower pressing unit 20 up and down; and a foreign matter suction unit 30 that sucks foreign matters, wherein the upper pressing unit 10 includes an upper compressing member 12 protruding downward and an upper support member 11 in which the upper compressing member is fixed to a lower portion, and the lower pressing unit 20 includes a lower compressing member 22 protruding upward and a lower support member 21 in which the lower compressing member is fixed to an upper portion, the upper compressing member 12 and the lower compressing member 22 are located in opposite directions on the same line, and are moved to a compressed position by driving the upper support member 11 and the lower support member 21 or separated in opposite directions to each other, and the upper support member 11 includes an air injection nozzle 14 that injects air obliquely from an outside of the upper compressing member 12 toward a joining surface of the fed electrode tab and electrode lead.

The apparatus for compressing a joint of an electrode tab and an electrode lead 100 of the present disclosure may be used in a process of compressing a joint of an electrode tab and an electrode lead included in an electrode assembly of a jelly-roll type, a stack type, a stack/folding type, and the like.

The joint 66 of the electrode tab and the electrode lead of the electrode assembly 60 is fed between the upper compressing member 12 and the lower compressing member 22, and in this case, a body 61 of the electrode assembly may be located outside the upper compressing member 12 and the lower compressing member 22.

As illustrated in FIG. 1, the apparatus for compressing a joint of an electrode tab and an electrode lead 100 of the present disclosure may include the air injection nozzle 14 that is installed to inject air obliquely from the outside of the upper compressing member 12 toward the joining surface of the fed electrode tab and electrode lead, thereby effectively removing foreign matters present in the electrode tab, the electrode lead, and the joint of the electrode tab and the electrode lead during the compression process. In addition, as described above, foreign matters moved from the electrode tab, the electrode lead, and the joint of the electrode tab and the electrode lead into the apparatus for compressing a joint of an electrode tab and an electrode lead 100 by the air injection of the air injection nozzle 14 are sucked by the foreign matter suction unit 30.

In one embodiment of the present invention, the air injection nozzle 14 may be installed to inject air in a direction forming an angle of 10° to 80°, preferably 30° to 60° with respect to the joining surfaces of the fed electrode tab and electrode lead. When the air is injected at the above angle, foreign matters may be removed more effectively.

In one embodiment of the present invention, when using the apparatus for compressing a joint of an electrode tab and an electrode lead 100, the operation of the air injection nozzle 14 needs to be controlled so that foreign matter does not contaminate the body of the electrode assembly 60. That is, as illustrated in FIG. 2, when air is injected by the air injection nozzle 14 at the compressed position (closed state) of the upper compressing member 12 and the lower compressing member 22, the injected air is blocked by the closed upper compressing member 12 and lower compressing member 22 and flows toward the body 61 of the electrode assembly. In this case, the problem that foreign matters contaminate the body 61 of the electrode assembly is caused.

Therefore, in the apparatus for compressing a joint of an electrode tab and an electrode lead 100 of the present disclosure, as illustrated in FIG. 3, the air injection nozzle 14 may be controlled not to operate at the compressed position (closed state) of the upper compressing member 12 and the lower compressing member 22 (FIG. 3B), and to operate at a non-compressed position (open state) of the upper compressing member 12 and the lower compressing member 22 (FIG. 3A).

Furthermore, the air injection of the air injection nozzle 14 may be controlled to be performed only in a state where the upper compressing member 12 and the lower compressing member 22 are separated by 3 mm or more, preferably 5 mm or more, and more preferably 10 mm or more. In this case, the air injection nozzle 14 does not operate not only when the upper compressing member 12 and the lower compressing member 22 are in the closed state, but also when the separation distance is less than the above range. When the air injection nozzle 14 operates only in the state where the separation distance is formed as described above, foreign matters may be more effectively prevented from flowing into the body 61 of the electrode assembly.

In the present disclosure, since the operation of the air injection nozzle 14 may be controlled by a control process commonly used in this field, detailed descriptions thereof will be omitted.

In one embodiment of the present invention, as illustrated in FIG. 4, the air injection nozzle 14 may be controlled to operate when the joint of the electrode tab and the electrode lead formed on the electrode assembly 60 is fed in the state where the upper compressing member 12 is raised, not to operate from the time when the upper compressing member 12 is lowered to the time when the upper compressing member is raised through the compression process, and operate again when the joint of the electrode tab and electrode lead is discharged after the compression is completed. When the air injection nozzle 14 operates according to the above conditions, it is possible to more effectively prevent foreign matters from flowing into the body of the electrode assembly 60.

In one embodiment of the present invention, as illustrated in FIG. 3, the lower support member 2021 may further include the air injection nozzle 24 that injects air obliquely from the outside of the lower compressing member 22 toward the joining surface of the electrode tab and the electrode lead formed on the electrode assembly 60.

In one embodiment of the present invention, the air injection nozzle 24 may be installed to inject air in a direction forming an angle of 10° to 80°, preferably 30° to 70° with respect to the joining surfaces of the fed electrode tab and electrode lead. When the air is injected at the above angle, foreign matters may be removed more effectively.

In one embodiment of the present invention, as illustrated in FIG. 3, the air injection nozzle 24 may be controlled not to operate at the compressed position (closed state) of the upper compressing member 12 and the lower compressing member 22 (FIG. 3B), and to operate at a non-compressed position (open state) of the upper compressing member 12 and the lower compressing member 22 (FIG. 3A).

Furthermore, the air injection of the air injection nozzle 24 may be controlled to be performed only in a state where the upper compressing member 12 and the lower compressing member 22 are separated by 3 mm or more, preferably 5 mm or more, and more preferably 10 mm or more. In this case, the air injection nozzle 24 does not operate not only when the upper compressing member 12 and the lower compressing member 22 are in the closed state, but also when the separation distance is less than the above range. When the air injection nozzle 24 operates only in the state where the separation distance is formed, it is possible to more effectively prevent foreign matters from flowing into the body of the electrode assembly 60.

In the present disclosure, since the operation of the air injection nozzle 24 may be controlled by a control process commonly used in this field, detailed descriptions thereof will be omitted.

In one embodiment of the present invention, as illustrated in FIG. 4, the air injection nozzle 24 included in the lower compressing member 22 may be controlled to operate when the joint 66 of the electrode tab and the electrode lead is fed in the state where the lower compressing member 22 is lowered, and not to operate from the time when the lower compressing member 22 is raised to the time when the lower compressing member 22 is lowered through the compression process, and to operate again when the joint of the electrode tab and electrode lead is discharged after the compression is completed. When the air injection nozzle 24 operates according to the above conditions, it is possible to more effectively prevent foreign matters from flowing into the body of the electrode assembly 60.

In one embodiment of the present invention, the upper compressing member 12 and the lower compressing member 22 may be driven to be repeatedly closed and opened by the raising and lowering of the upper support member 11 and the lower support member 21 by a driving device 40. In addition, the lower pressing unit 20 may be provided to raise and lower only the upper pressing unit 10 in a fixed state.

In one embodiment of the present invention, the foreign matter suction unit 30 may include a suction pipe 32 that communicates with a space opposite to the electrode assembly based on the upper compressing member 12 and the lower compressing member 22 and an inhaler 34 that is connected to the suction pipe.

Although the present invention has been described in relation to the above-described embodiments, various modifications and alterations may be made without departing from the gist and scope of the present disclosure. Accordingly, these modifications and alterations fall within the scope of the claims as long as they belong to the gist of the present disclosure.

---

[Description of Reference Signs]

---

| | |
|---|---|
| 10: Upper pressing unit | 11: Upper support member |
| 12: Upper compressing member | 14: Air injection nozzle |
| 20: Lower pressing unit | 21: Lower support member |
| 22: Lower compressing member | 24: Air injection nozzle |
| 30: Foreign matter suction unit | 32: Suction pipe |
| 34: Inhaler | 40: Driving unit |
| 60: Electrode assembly | 62: Electrode tab |
| 64: Electrode lead | |
| 66: Joint of electrode tab and electrode lead | |
| 100: Apparatus for compressing joint of electrode tab and electrode lead | |

---

The invention claimed is:

1. An apparatus for compressing a joint formed between an electrode tab extending from an electrode assembly and an electrode lead, the apparatus comprising:

an upper pressing unit;

a lower pressing unit;

a driving unit configured to move the upper pressing unit and the lower pressing unit up and down; and a suction unit, wherein the upper pressing unit comprises an upper compressing member protruding toward the lower pressing unit and an upper support member in which the upper compressing member is fixed to a lower portion of the upper support member, and the lower pressing unit comprises a lower compressing member protruding toward the upper pressing unit and a lower support member in which the lower compressing member is fixed to an upper portion of the lower support member, wherein the upper compressing member and the lower compressing member are located in opposite directions on the same line, and are moved to a compressed position by driving the upper support member and the lower support member toward each other, and are separated by driving the upper support member and the lower support member in opposite directions from each other, and the upper support member comprises an upper air injection nozzle configured to inject air toward the joint, wherein the upper air injection nozzle is configured to operate when the joint is positioned in a state where the upper compressing member is raised, not to operate from a time when the upper compressing member is lowered to a time when the upper compressing member is raised through a compression process, and to operate again when the joint is discharged after the compression process is completed, wherein the lower support member further includes a lower air injection nozzle configured to inject air toward the joint, and wherein the lower air injection nozzle is configured to operate when the joint is positioned in a state where the lower compressing member is lowered, not to operate from a time when the lower compressing member is raised to a time when the lower compressing member is lowered through a compression process, and to operate again when the joint is discharged after a compression process is completed.

2. The apparatus of claim 1, wherein the upper air injection nozzle is configured to inject air in a direction forming an angle of 10° to 80° with respect to a surface of the joint.

3. The apparatus of claim 1, wherein the lower air injection nozzle is configured to inject air in a direction forming an angle of 10° to 80° with a surface of the joint.

4. The apparatus of claim 1, wherein the suction unit comprises a suction pipe and an inhaler connected to the suction pipe, wherein the suction pipe communicates with a space separated from the electrode assembly positioned between the upper and lower compression members.

5. The apparatus of claim 1, wherein the upper air injection nozzle is configured to inject air toward the joint at an oblique angle relative to a surface of the joint.

6. The apparatus of claim 1, wherein the lower air injection nozzle is configured to inject air toward the joint at an oblique angle relative to a surface of the joint.

* * * * *